(12) United States Patent
Kurebayashi

(10) Patent No.: US 12,650,753 B2
(45) Date of Patent: Jun. 9, 2026

(54) INFORMATION PROCESSING SYSTEM, NON-TRANSITORY COMPUTER READABLE MEDIUM, AND INFORMATION PROCESSING METHOD

(71) Applicant: FUJIFILM Business Innovation Corp., Tokyo (JP)

(72) Inventor: Makoto Kurebayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/864,841

(22) Filed: Jul. 14, 2022

(65) Prior Publication Data

US 2023/0315244 A1 Oct. 5, 2023

(30) Foreign Application Priority Data

Mar. 29, 2022 (JP) ................................. 2022-053337

(51) Int. Cl.
*G06F 3/048* (2013.01)
*G06F 3/0481* (2022.01)
*G06F 3/04842* (2022.01)
*G06F 16/16* (2019.01)

(52) U.S. Cl.
CPC ........ G06F 3/0481 (2013.01); G06F 3/04842 (2013.01); G06F 16/168 (2019.01); *G06F 2203/04806* (2013.01)

(58) Field of Classification Search
CPC .. G06F 3/0481; G06F 16/168; G06F 3/04842; G06F 2203/04806
See application file for complete search history.

(56) References Cited

U.S. PATENT DOCUMENTS

| | | | |
|---|---|---|---|
| 8,769,431 B1 * | 7/2014 | Prasad | G06F 3/0488 |
| | | | 715/764 |
| 11,190,654 B2 * | 11/2021 | Tsukada | H04N 1/0044 |
| 11,758,068 B2 * | 9/2023 | Bindana | H04N 1/0044 |
| | | | 358/1.15 |
| 11,900,044 B2 * | 2/2024 | Yamada | G06F 40/106 |
| 11,983,447 B2 * | 5/2024 | Onoguchi | G06F 3/1234 |
| 2004/0267793 A1 * | 12/2004 | Sato | G11B 27/34 |

(Continued)

FOREIGN PATENT DOCUMENTS

| | | |
|---|---|---|
| JP | 2009-277151 A | 11/2009 |
| JP | 2011-151674 A | 8/2011 |
| JP | 2013-050979 A | 3/2013 |

OTHER PUBLICATIONS

May 26, 2023 extended Search Report issued in European Patent Application No. 22192700.7.

(Continued)

*Primary Examiner* — Nicholas Augustine
(74) *Attorney, Agent, or Firm* — Oliff PLC

(57) ABSTRACT

An information processing system includes a processor configured to: receive an input operation performed by a user on an image representing a collection of plural electronic documents, the image being displayed on a display; and perform control to enlarge and display, on the display, an image of a predetermined page determined in advance for each of the electronic documents, among one or more pages constituting each of the electronic documents, so that a display size thereof will be larger than the image representing the collection.

18 Claims, 12 Drawing Sheets

(56)        References Cited

U.S. PATENT DOCUMENTS

| | | | |
|---|---|---|---|
| 2005/0105129 A1* | 5/2005 | Takahashi .......... | H04N 1/32529 358/1.15 |
| 2007/0226652 A1* | 9/2007 | Kikuchi ................ | G06F 3/0482 715/757 |
| 2008/0034381 A1* | 2/2008 | Jalon ..................... | G06F 16/168 719/329 |
| 2010/0315359 A1* | 12/2010 | Seong ..................... | G09G 3/36 345/173 |
| 2011/0242024 A1* | 10/2011 | Fukumoto .......... | H04N 1/00472 345/173 |
| 2012/0050800 A1* | 3/2012 | Maruyama ......... | H04N 1/00458 358/1.15 |
| 2012/0192110 A1* | 7/2012 | Wu ..................... | G06F 3/04817 715/815 |
| 2014/0165006 A1* | 6/2014 | Chaudhri ................ | H04N 7/15 715/835 |
| 2014/0189593 A1* | 7/2014 | Kurita .................. | G06F 3/0483 715/835 |
| 2017/0039168 A1* | 2/2017 | Hassan .................. | G06Q 10/10 |
| 2019/0065043 A1* | 2/2019 | Zambetti ............ | G06F 3/04845 |
| 2021/0110103 A1* | 4/2021 | Casas ..................... | G06F 16/51 |
| 2021/0286510 A1* | 9/2021 | Tyler ..................... | G06F 3/0481 |
| 2022/0057904 A1 | 2/2022 | Bito | |
| 2023/0171360 A1* | 6/2023 | Bindana ................ | G06F 3/1257 358/1.18 |

OTHER PUBLICATIONS

Dec. 2, 2025 Office Action issued in Japanese Patent Application No. 2022-053337.
Mar. 24, 2026 Office Action issued in Japanese Patent Application No. 2022-053337.

* cited by examiner

FIG. 8

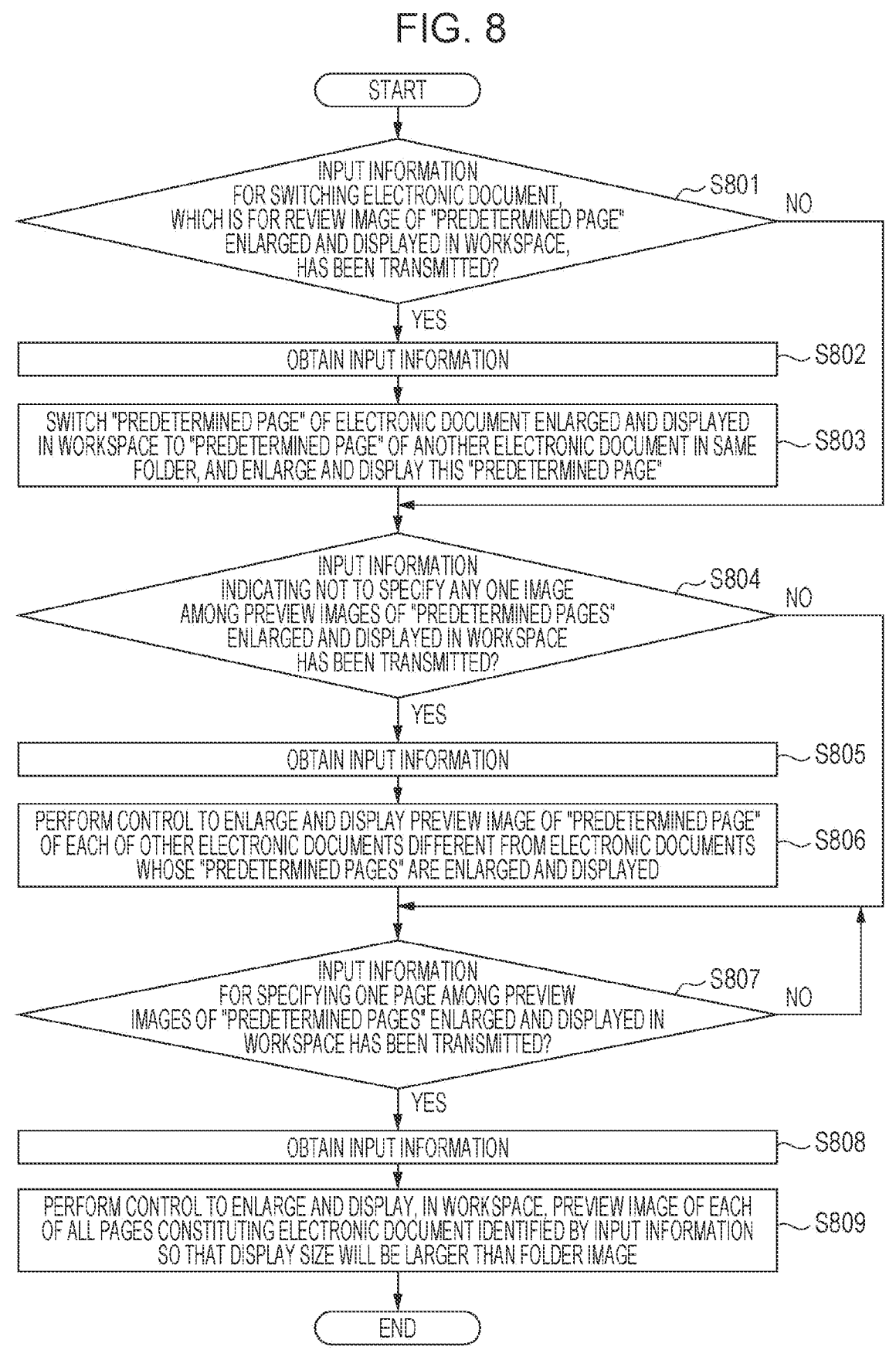

START

INPUT INFORMATION
FOR SWITCHING ELECTRONIC DOCUMENT,
WHICH IS FOR REVIEW IMAGE OF "PREDETERMINED PAGE"
ENLARGED AND DISPLAYED IN WORKSPACE,
HAS BEEN TRANSMITTED? — S801   NO

YES

OBTAIN INPUT INFORMATION — S802

SWITCH "PREDETERMINED PAGE" OF ELECTRONIC DOCUMENT ENLARGED AND DISPLAYED
IN WORKSPACE TO "PREDETERMINED PAGE" OF ANOTHER ELECTRONIC DOCUMENT IN SAME
FOLDER, AND ENLARGE AND DISPLAY THIS "PREDETERMINED PAGE" — S803

INPUT INFORMATION
INDICATING NOT TO SPECIFY ANY ONE IMAGE
AMONG PREVIEW IMAGES OF "PREDETERMINED PAGES"
ENLARGED AND DISPLAYED IN WORKSPACE
HAS BEEN TRANSMITTED? — S804   NO

YES

OBTAIN INPUT INFORMATION — S805

PERFORM CONTROL TO ENLARGE AND DISPLAY PREVIEW IMAGE OF "PREDETERMINED PAGE"
OF EACH OF OTHER ELECTRONIC DOCUMENTS DIFFERENT FROM ELECTRONIC DOCUMENTS
WHOSE "PREDETERMINED PAGES" ARE ENLARGED AND DISPLAYED — S806

INPUT INFORMATION
FOR SPECIFYING ONE PAGE AMONG PREVIEW
IMAGES OF "PREDETERMINED PAGES" ENLARGED AND DISPLAYED IN
WORKSPACE HAS BEEN TRANSMITTED? — S807   NO

YES

OBTAIN INPUT INFORMATION — S808

PERFORM CONTROL TO ENLARGE AND DISPLAY, IN WORKSPACE, PREVIEW IMAGE OF EACH
OF ALL PAGES CONSTITUTING ELECTRONIC DOCUMENT IDENTIFIED BY INPUT INFORMATION
SO THAT DISPLAY SIZE WILL BE LARGER THAN FOLDER IMAGE — S809

END

INFORMATION PROCESSING SYSTEM, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2022-053337 filed Mar. 29, 2022.

BACKGROUND

(i) Technical Field

The present disclosure relates to an information processing system, a non-transitory computer readable medium, and an information processing method.

(ii) Related Art

There have been available techniques for collecting a plurality of electronic documents and displaying an image (for example, an image called "folder") representing the collection of these electronic documents (such as Japanese Unexamined Patent Application Publication No. 2011-151674).

In order to find an electronic document of interest from a collection of electronic documents, it is necessary to select and open each of the electronic documents included in the collection, and to grasp the contents thereof.

SUMMARY

Aspects of non-limiting embodiments of the present disclosure relate to enabling a user to grasp the contents of each of a plurality of electronic documents included in a collection with a simple operation, as compared with the case of selecting and opening each of the electronic documents included in the collection.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including a processor configured to: receive an input operation performed by a user on an image representing a collection of a plurality of electronic documents, the image being displayed on a display; and perform control to enlarge and display, on the display, an image of a predetermined page determined in advance for each of the electronic documents, among one or more pages constituting each of the electronic documents, so that a display size thereof will be larger than the image representing the collection.

BRIEF DESCRIPTION OF THE DRAWINGS

An exemplary embodiment of the present disclosure will be described in detail based on the following figures, wherein:

FIG. 8 is a flowchart illustrating the flow of a process of the management server in the case where the management server performs control to enlarge and display, in a workspace, the preview image of a "predetermined page" of each of a plurality of electronic documents included in a folder;

DETAILED DESCRIPTION

Hereinafter, an exemplary embodiment of the present disclosure will be described in detail with reference to the accompanying drawings.

Configuration of Information Processing System

Figure 1:
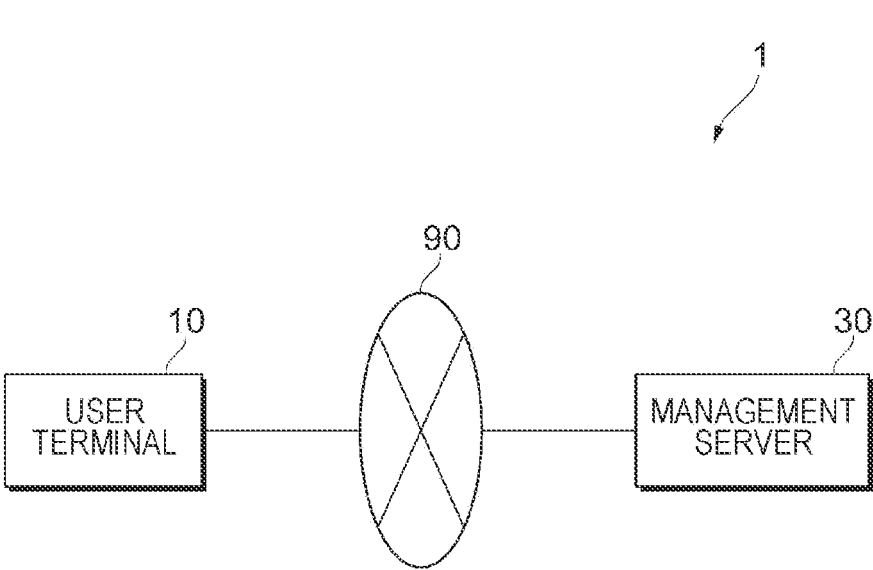
FIG. 1 is a diagram illustrating an example of the overall configuration of an information processing system to which an exemplary embodiment is applied.

FIG. 1 is a diagram illustrating an example of the overall configuration of an information processing system 1 to which the present exemplary embodiment is applied.

The information processing system 1 is configured by connecting a user terminal 10 and a management server 30 via a network 90. The network 90 is, for example, a local area network (LAN) or the Internet.

The user terminal 10 is an information processing apparatus such as a personal computer, a smartphone, or a tablet terminal operated by a user. The user terminal 10 displays an operation screen (hereinafter referred to as a "workspace") of so-called file handling software on a display 16 (see FIG. 2), and displays, in the workspace, an image (hereinafter referred to as a "folder image") representing a collection (hereinafter referred to as a "folder") of a plurality of electronic documents to be handled by the user. The folder image displayed in the workspace is a so-called "shortcut", and the folder image itself is stored in a database. Plural workspaces may be generated, and each of these workspaces may be displayed on the display 16 in response to an input operation performed by the user. Moreover, a workspace may be shared with another user via the network 90.

The user terminal 10 receives a first input operation performed by the user on a folder image displayed in a workspace. On receipt of the first input operation, the user terminal 10 enlarges and displays, in the workspace, the image of, among one or more pages constituting each of a plurality of electronic documents included in the folder, a predetermined page determined in advance for each electronic document so that the display size thereof will be larger than the folder image. Examples of the "predetermined page" include the first page, a page most recently opened by the user, and a page individually specified by the user. A specific example of an operation of specifying the "predetermined page" will be described later with reference to FIG. 11.

The user terminal 10 receives a second input operation performed by the user on the image of the predetermined page determined in advance for each electronic document, which is enlarged and displayed in the workspace. On receipt of the second input operation, the user terminal 10 switches the image of the page being enlarged and displayed. That is, in response to the second input operation, the electronic document whose predetermined page is enlarged and displayed is switched. For example, in the case where the folder includes three electronic documents, in response to the second input operation, the image of, among one or more pages constituting each of the three electronic documents, a predetermined page determined in advance for each electronic document is displayed in a switching manner.

The management server 30 is an information processing apparatus as a server that manages the overall information processing system 1. The management server 30 is capable of performing at least some of the above-mentioned processes performed by the user terminal 10. That is, the management server 30 is capable of performing control to display a workspace on the display 16 of the user terminal 10, and control to display a folder image in the workspace.

When the user terminal 10 receives the first input operation, the management server 30 is able to perform control to enlarge and display, in a workspace, the image of, among one or more pages constituting each of a plurality of electronic documents included in the folder, a predetermined page determined in advance for each electronic document so that the display size thereof will be larger than the folder image. In addition, in response to the second input operation, the management server 30 is able to perform control to switch the electronic document whose predetermined page is enlarged and displayed. Note that these processes performed by the management server 30 will be described in detail later.

The configuration of the above-described information processing system 1 is only one example, and it is only necessary for the information processing system 1 as a whole to be equipped with functions for realizing the above processes. Therefore, some or all of the functions for realizing the above processes may be shared or collaborated in the information processing system 1. That is, as described above, some or all of the functions of the user terminal 10 may be the functions of the management server 30, and some or all of the functions of the management server 30 may be the functions of the user terminal 10. Furthermore, some or all of the functions of each of the user terminal 10 and the management server 30 included in the information processing system 1 may be transferred to another server or the like (not illustrated). This promotes the processes of the information processing system 1 as a whole, and also allows the processes to be complemented with each other.

Hardware Configuration of User Terminal

Figure 2:
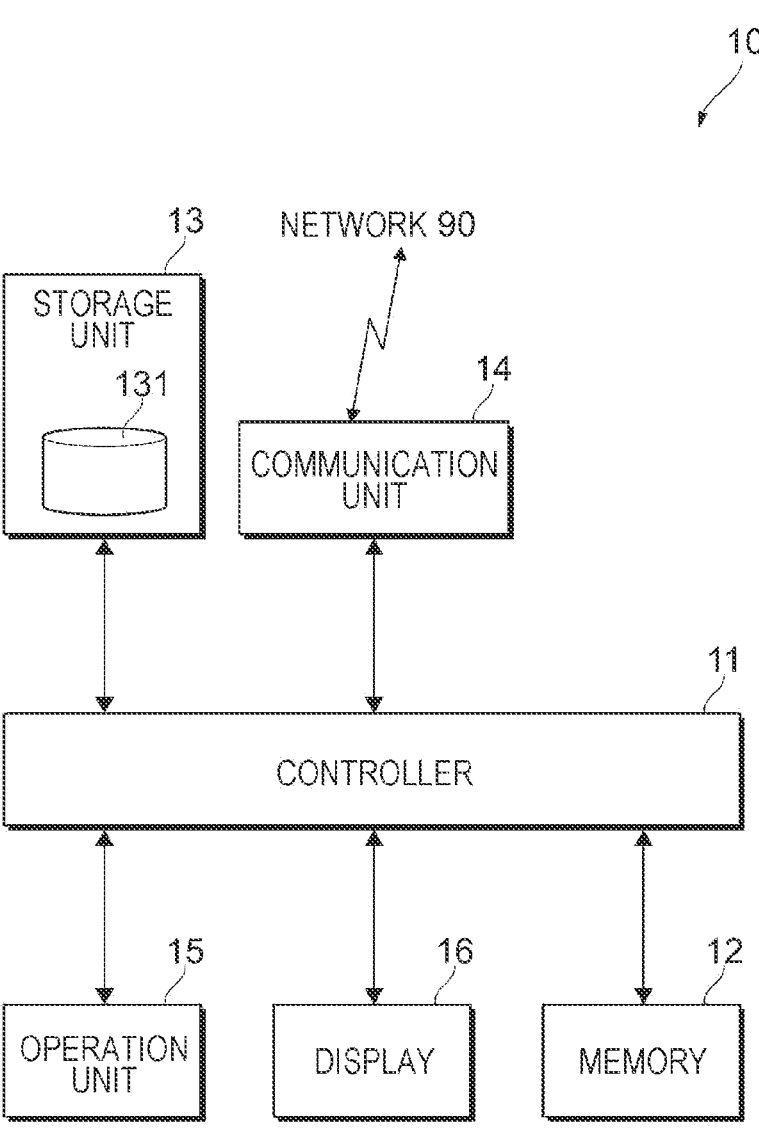
FIG. 2 is a diagram illustrating the hardware configuration of a user terminal as an information processing apparatus to which the present exemplary embodiment is applied.

FIG. 2 is a diagram illustrating the hardware configuration of the user terminal 10 as an information processing apparatus to which the present exemplary embodiment is applied.

The user terminal 10 includes a controller 11, a memory 12, a storage unit 13, a communication unit 14, an operation unit 15, and the display 16. These units are connected by a data bus, an address bus, a peripheral component interconnect (PCI) bus, and the like.

The controller 11 a processor that controls the functions of the user terminal 10 through execution of various types of software such as an operating system (OS, basic software) and application software. The controller 11 is constituted of, for example, a central processing unit (CPU). The memory 12 is a storage area that stores various types of software and data used for execution thereof, and is used as a work area for arithmetic processing. The memory 12 is constituted of, for example, random access memory (RAM).

The storage unit 13 is a storage area that stores input data for various types of software and output data from various types of software. The storage unit 13 is constituted of, for example, a hard disk drive (HDD), a solid state drive (SSD), and semiconductor memory used for storing programs and various types of setting data. As a database that stores various types of information, a folder database (DB) 131, which stores a folder including a plurality of electronic documents, is stored in the storage unit 13.

The communication unit 14 transmits and receives data to and from the management server 30 and the outside via the network 90. The operation unit 15 is constituted of, for example, a keyboard, a mouse, a mechanical button, and a switch, and receives input operations. In addition, the operation unit 15 includes an operation image displayed on the display 16. The operation unit 15 also includes a touch sensor that integrally constitutes a touchscreen together with the display 16. The display 16 is constituted of, for example, a liquid crystal display (LCD) or an electroluminescence (EL) display used for displaying information, and displays data such as images and text. A user interface is displayed on the display 16.

Hardware Configuration of Management Server

The hardware configuration of the management server 30 has a configuration that is the same as or similar to the hardware configuration of the user terminal 10 illustrated in FIG. 2. That is, the management server 30 includes a controller, a memory, a storage unit, a communication unit, an operation unit, and a display whose functions are respectively the same as or similar to the controller 11, the memory 12, the storage unit 13, the communication unit 14, the operation unit 15, and the display 16 illustrated in FIG. 2, and illustrations and descriptions thereof are omitted.

Functional Configuration of Controller of User Terminal

Figure 3:
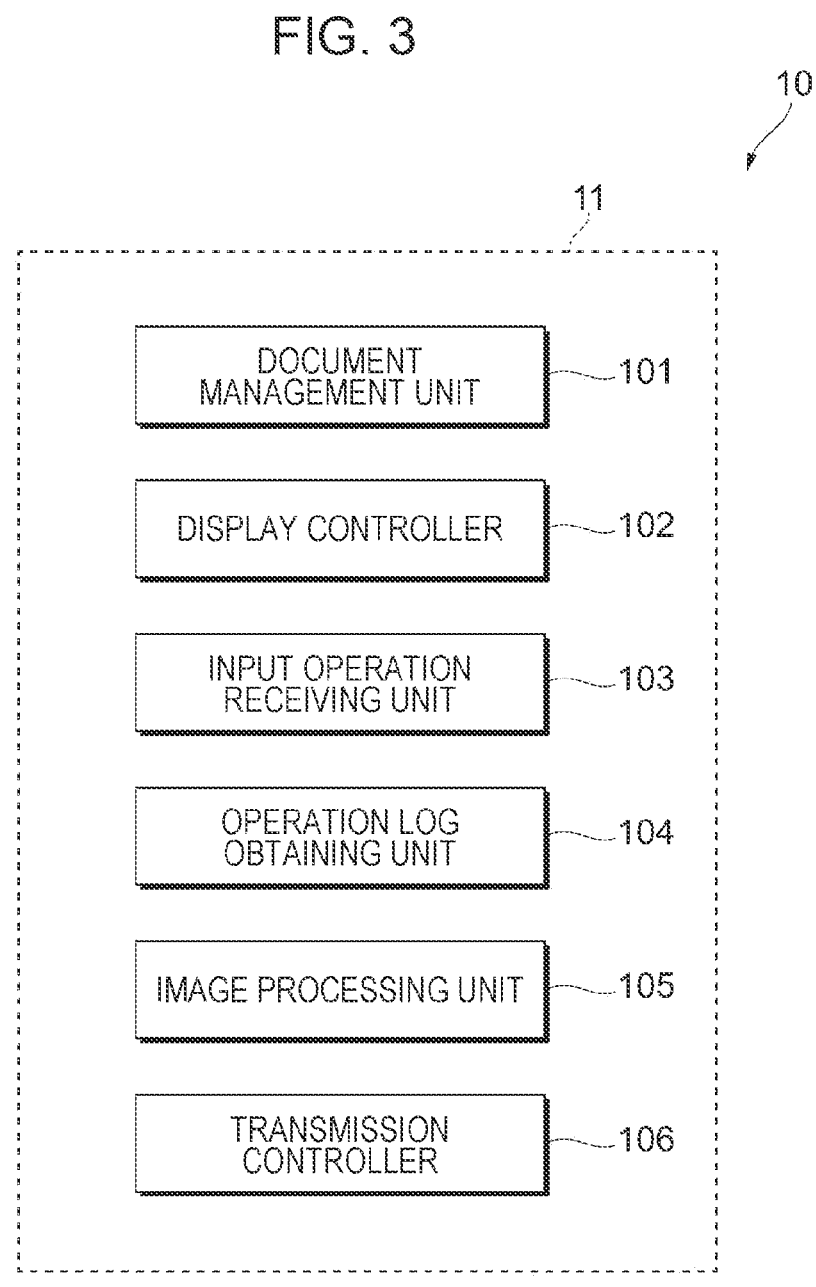
FIG. 3 is a diagram illustrating the functional configuration of a controller of the user terminal.

FIG. 3 is a diagram illustrating the functional configuration of the controller 11 of the user terminal 10.

In the controller 11 of the user terminal 10, a document management unit 101, a display controller 102, an input operation receiving unit 103, an operation log obtaining unit 104, an image processing unit 105, and a transmission controller 106 function.

The document management. unit 101 stores and manages a folder including a plurality of electronic documents in a database. Specifically, the document management unit 101 stores and manages a folder displayable in a workspace, and a plurality of electronic documents included in the folder in the folder DB 131 in the storage unit 13. The type of electronic documents included in the folder stored in the folder DB 131 is not particularly limited, and, for example, the type may be text documents with the concept of pages, which are generated by application software for generating documents. In addition, the folder may be a so-called compressed folder that has been compressed.

For the folder stored in the folder DB 131, and the electronic documents included in the folder, identification information for uniquely identifying each of them (such as a folder ID or a document ID) and information regarding a user's operation log (hereinafter referred to as "operation log information") are associated. Of these items of information, with the operation log information, information (such as a user ID) for uniquely identifying a user who has performed an input operation for opening each of the electronic documents included in the folder is associated. This enables to manage, as a log, which user has enlarged and displayed, in a workspace, the preview image of which page of which electronic document in which folder.

The display controller 102 performs control to display various types of information on the display 16 (see FIG. 2). For example, the display controller 102 performs control to display a workspace on the display 16. The workspace displayed on the display 16 may be displayed by activating user-dedicated application software installed in advance in the user terminal 10, or by accessing a user-dedicated website.

In addition, the display controller 102 performs control to display the image of a specified folder in the workspace. Moreover, the display controller 102 performs control to enlarge and display, in the workspace, the preview image of a predetermined page among one or more pages constituting each of electronic documents included in a folder selected by the first input operation so that the display size thereof will be larger than the folder image.

Here, the preview images of the "predetermined pages" are enlarged and displayed one page at a time sequentially in units of electronic documents in response to input operations performed by the user. For example, it is assumed that the folder includes three electronic documents. In this case, when an input operation for selecting the folder is performed, the preview image of a "predetermined page" of one electronic document among the three electronic documents is enlarged and displayed in the workspace. In response to an input operation performed by the user, the preview image of the "predetermined page" of each of the other two electronic documents is sequentially enlarged and displayed. The order in which the pages are enlarged and displayed as preview images when an input operation for selecting the folder is performed is not particularly limited. For example, the order may be the order in which the electronic documents are arranged in the folder (such as the order of file name, format, generation date and time, or capacity), or the user may be allowed to set the order of arrangement.

In addition, the display controller 102 performs control to enlarge and display, in the workspace, for example, the preview image of the first page of each of the electronic documents included in the folder as the preview image of the "predetermined page" so that the display size thereof will be larger than the folder image. Moreover, the display controller 102 performs control to enlarge and display, in the workspace, for example, the preview image of a page most recently opened by the user for each of the electronic documents included in the folder as the preview image of the "predetermined page" so that the display size thereof will be larger than the folder image.

Here, the display controller 102 performs control to enlarge and display, in the workspace, the preview image of a "predetermined page" determined for each electronic document on the basis of the electronic document's operation log information. For example, for an electronic document that has never been opened by an input operation performed by the user, the display controller 102 performs control to enlarge and display the preview image of the first page; and, for an electronic document that has been opened by an input operation performed by the user, the display controller 102 performs control to enlarge and display the preview image of a page most recently opened by an input operation performed by the user.

In addition, the display controller 102 may perform control to enlarge and display the preview image of the "predetermined page" in a mode in which the number of pages constituting each of the electronic documents is visually recognizable. Specifically, the display controller 102 may perform control to enlarge and display, in the workspace, a page processed by the later-described image processing unit 105 in accordance with the number of pages of the electronic document as the preview image of the "predetermined page" so that the display size thereof will be larger than the folder image. Note that a specific example of an image processed in accordance with the number of pages of the electronic document will be described later with reference to FIG. 12.

In addition, the display controller 102 performs control to enlarge and display, in the workspace, the preview image of a "predetermined page" of each of other electronic documents different from the electronic documents whose "predetermined pages" are enlarged and displayed in the workspace, in response to an input operation performed by the user. Note that a specific example of the case of enlarging and displaying, in the workspace, the preview image of a "predetermined page" of each of other electronic documents different from the electronic documents whose "predetermined pages" are enlarged and displayed in the workspace will be described later with reference to FIG. 10.

In addition, in response to an input operation for specifying one page among the preview images of the "predetermined pages" enlarged and displayed in the workspace, the display controller 102 performs control to enlarge and display, in the workspace, the preview image of each of all pages constituting an electronic document including the specified "predetermined page" so that the display size thereof will be larger than the folder image.

At this time, the display controller 102 performs control to support the visual recognition of the user, who visually observes the preview image of each of all pages including the specified "predetermined page", which constitute an electronic document in which the "predetermined page" has been specified. That is, the display controller 102 performs control to prevent the preview image of the "predetermined page" that has already been enlarged and displayed in the workspace from obstructing the visual recognition of the user, who visually observes the preview image of a page newly enlarged and displayed in the workspace.

Specifically, the display controller 102 may perform, as "control to support the visual recognition of the user", for example, control to enlarge and display, in the workspace, the preview image of each of all pages constituting an electronic document in which the "predetermined page" has been specified so that this preview image will be superimposed on the preview image of the "predetermined page" that has already been enlarged and displayed in the workspace. Accordingly, the "predetermined page" that has already been enlarged and displayed will be hidden behind the preview image of the page newly enlarged and displayed.

Likewise, the display controller 102 may perform, as "control to support the visual recognition of the user", for example, control to display, in the workspace, the preview image of the "predetermined page" that has already been enlarged and displayed in the workspace so that the display size thereof will be smaller than the preview image of each of all pages constituting an electronic document in which the "predetermined page" has been specified. Moreover, for example, the display controller 102 may perform, as "control to support the visual recognition of the user", control not to display, in the workspace, the preview image of the "predetermine page" that has already enlarged and displayed in the workspace. That is, the display controller 102 performs control to close the "predetermined page" that has already been enlarged and displayed.

The input operation receiving unit 103 receives an input operation performed by the user. Exemplary input operations performed by the user include a touch operation and a mouse operation using a finger. For example, the input operation receiving unit 103 receives an input operation for activating application software and displaying a workspace on the display 16 (see FIG. 2).

In addition, the input operation receiving unit 103 receives an input operation for specifying a folder and displaying an image thereof in the workspace, and the first input operation for selecting the folder image displayed in the workspace. Here, examples of the "input operation for selecting the folder image" include an operation of allowing a cursor, which moves in the workspace along with a mouse operation performed by the user, to be superimposed on the folder image (so-called mouse-over operation), and an operation of touching or clicking on the folder image.

In addition, the input operation receiving unit 103 receives the second input operation for switching the electronic document, which is for the preview image of the "predetermined page" enlarged and displayed in the workspace. The input operation receiving unit 103 also receives an input operation for specifying any one image among the preview images of the "predetermined pages" enlarged and displayed in the workspace. Specifically, for example, the input operation receiving unit 103 receives an operation of pressing a button for switching the electronic document, which is displayed. along with the preview image of the "predetermined page". Note that a specific example of the button for switching the electronic document will be described later with reference to FIG. 10.

In addition, the input operation receiving unit 103 receives an input operation indicating not to specify any one image among the preview images of the "predetermined pages" enlarged and displayed in the workspace. Specifically, for example, the input operation receiving unit 103 receives an operation of pressing a button for selecting another folder, which is displayed along with the preview images of the "predetermined pages". Note that a specific example of the button for selecting another folder will be described later with reference to FIG. 10.

In addition, the input operation receiving unit 103 receives an input operation for setting the display mode of the preview image of the "predetermined page" enlarged and displayed in the workspace. Here, examples of the "setting of the display mode" include the setting of a page whose preview image is enlarged and displayed as a "predetermined page" among one or more pages constituting the electronic document, and the setting of the appearance of the preview image that is enlarged and displayed. Among these settings, examples of the "page to be enlarged and displayed" include the first page of the electronic document, a page most recently opened by an input operation performed by the user, and an individually specified page. In addition, examples of the "appearance" include a mode in which the number of pages constituting each of electronic documents is visually recognizable from the preview image.

The input operation receiving unit 103 receives, as an input operation for getting the display mode of the preview image of a "predetermined page" enlarged and displayed in the workspace, an operation of pressing a button displayed along with the preview image of the "predetermined page". Note that a specific example of the button displayed along with the preview image of the "predetermined page" will be described later with reference to FIG. 10.

The operation log obtaining unit 104 obtains operation log information of each of electronic documents included in a folder. Specifically, the operation log obtaining unit 104 obtains operation log information of each of electronic documents included in a folder displayed in a workspace, among one or more folders stored in the folder DB 131 in the storage unit 13.

The image processing unit 105 processes the preview image of a "predetermined page" of each electronic document, which is enlarged and displayed in a workspace. For example, the image processing unit 105 performs processing so that the number of pages constituting each electronic document will be visually recognizable, or processing to enable distinction, at a glance, between the number of pages constituting each electronic document being a single page and the number of pages being multiple pages. Note that a specific example of the preview image processed by the image processing unit 105 will be described later with reference to FIG. 12.

The transmission controller 106 performs control to transmit various types of information to the management server 30 or to the outside via the communication unit 14 (see FIG. 2). For example, in the case where the management server 30 performs one or more of control to display a workspace on the display 16 of the user terminal 10, control to display a folder image in the workspace, and control to enlarge and display, in the workspace, the preview image of a "predetermined page" of each of electronic documents included in the folder, the transmission controller 106 performs control to transmit various types of input information whose input has been received by the input operation receiving unit 103 to the management server 30.

Functional Configuration of Controller of Management Server

Figure 4:
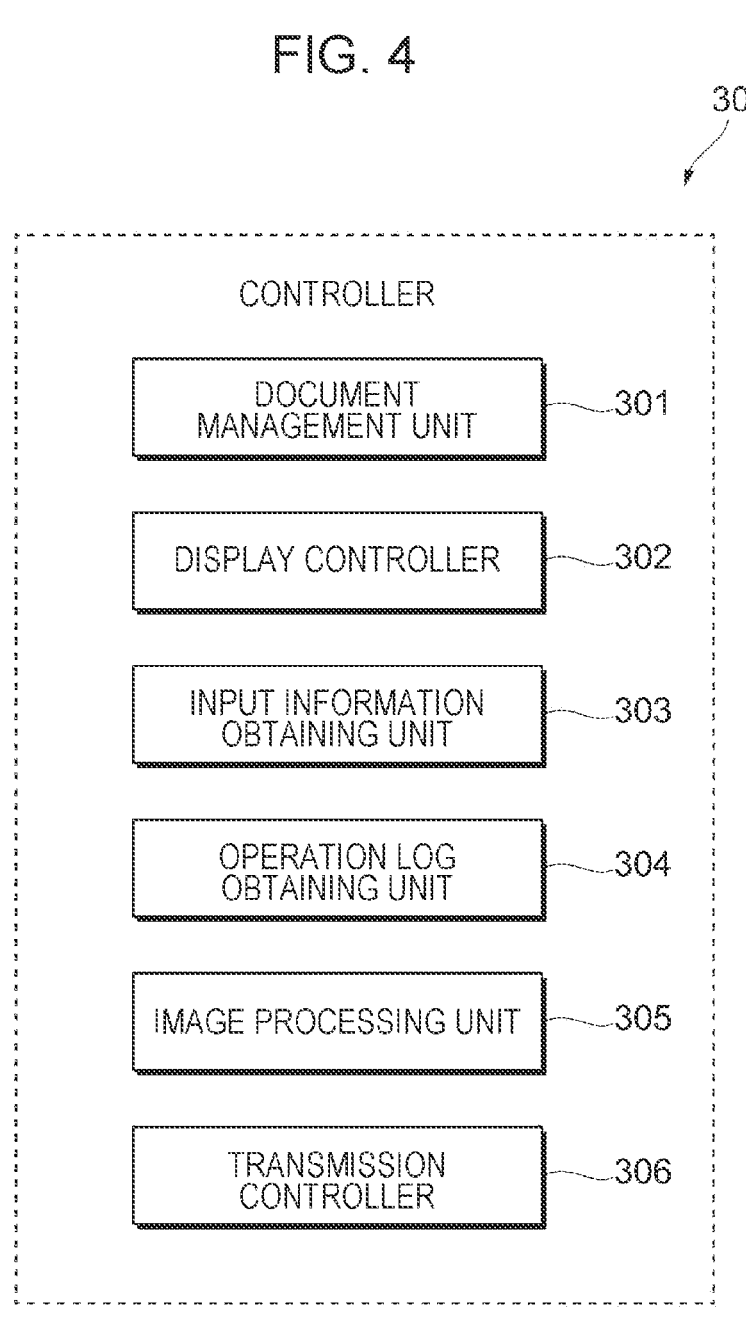
FIG. 4 is a diagram illustrating the functional configuration of a controller of a management server in the case where the management server performs control to display a workspace on a display of the user terminal, control to display an image of a folder in the workspace, and control to enlarge and display, in the workspace, the preview image of a "predetermined page" of each of a plurality of electronic documents included in the folder.

FIG. 4 is a diagram illustrating the functional configuration of the controller of the management server 30 in the case where the management server 30 performs control to enlarge and display, in a workspace, the preview image of a "predetermined page" of each of a plurality of electronic documents included in the folder.

In the case where these processes are performed by the management server 30, the controller of the management server 30 functions as a document management unit 301, a display controller 302, an input information obtaining unit 303, an operation log obtaining unit 304, an image processing unit 305, and a transmission controller 306. Among these units, the functions of the document management. unit 301, the display controller 302, the operation log obtaining unit 304, and the image processing unit 305 are the same as or similar to the functions of the document management unit 101, the display controller 102, the operation log obtaining unit 104, and the image processing unit 105 illustrated in FIG. 3, and descriptions thereof are omitted.

The input information obtaining unit 303 obtains various types of input information transmitted from the user terminal 10. For example, the input information obtaining unit 303 obtains input information input for displaying, in a workspace, the image of a folder including electronic documents stored and managed in a database in the storage unit of the management server 30.

In addition, for example, the input information obtaining unit 303 obtains input information input for selecting a folder image displayed in a workspace. Likewise, for example, the input information receiving unit 303 receives input information input for switching and displaying an electronic document for the preview image of a "predetermined page" of the electronic document, which is enlarged and displayed in the workspace. Moreover, for example, the input operation receiving unit 303 receives input information input for specifying any one image among the preview images of "predetermined pages" enlarged and displayed in the workspace.

The transmission controller 306 performs control to transmit various types of information to the user terminal 10 or to the outside via the communication unit. In addition, the transmission controller 306 performs control to transmit, to the user terminal 10, information regarding a folder specified by an input operation performed by the user, among one or more folders including a plurality of electronic documents, which are stored and managed in a database stored in the storage unit. For example, the transmission controller 306 performs control to transmit, to the user terminal 10, as "information regarding the folder", information such as data of the folder image, and data of the preview images of "predetermined pages" of electronic documents included in the folder.

Flow of Process of User Terminal

Figure 5:
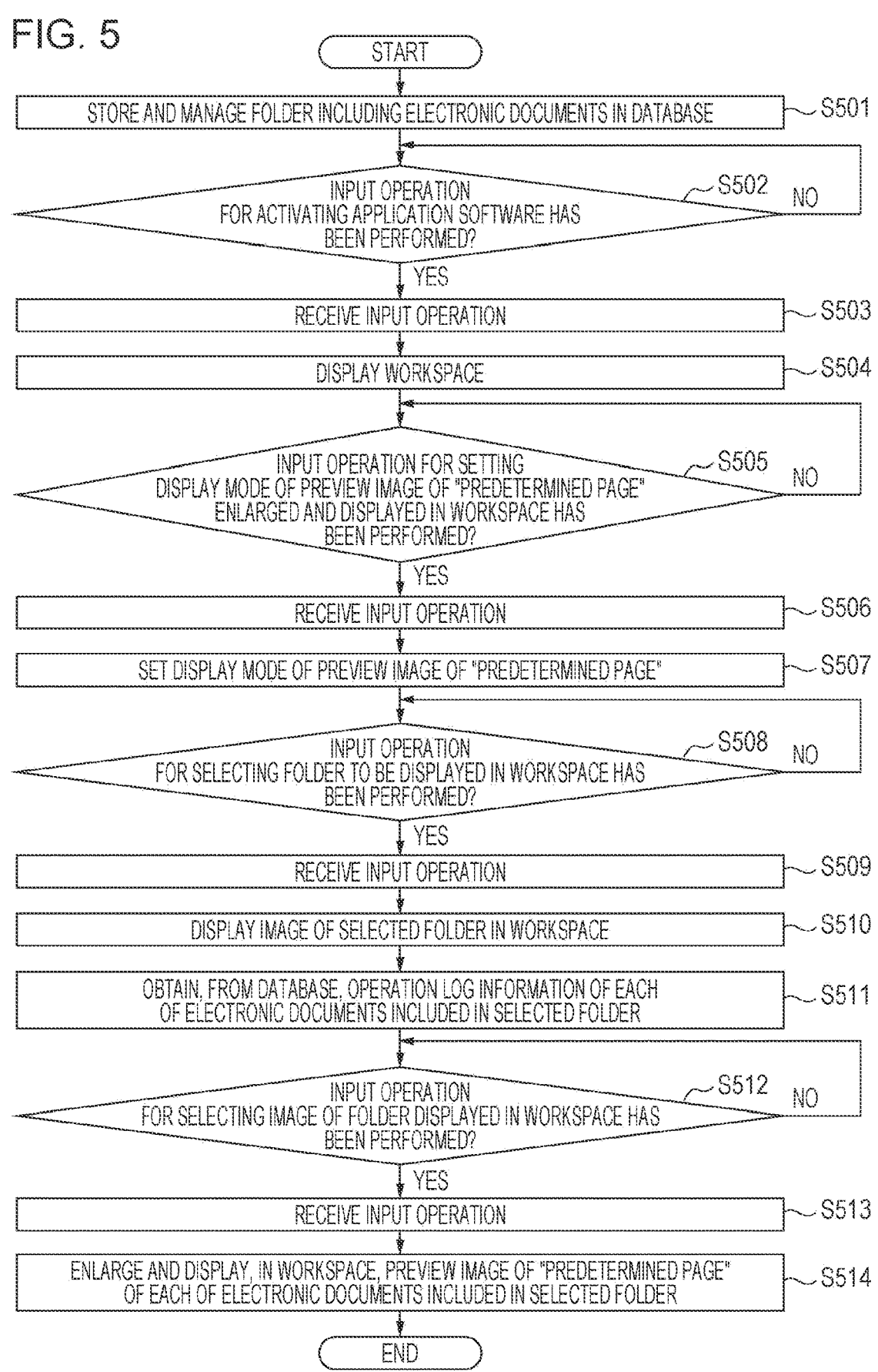
FIG. 5 is a flowchart illustrating the flow of a process of the user terminal.
Figure 6:
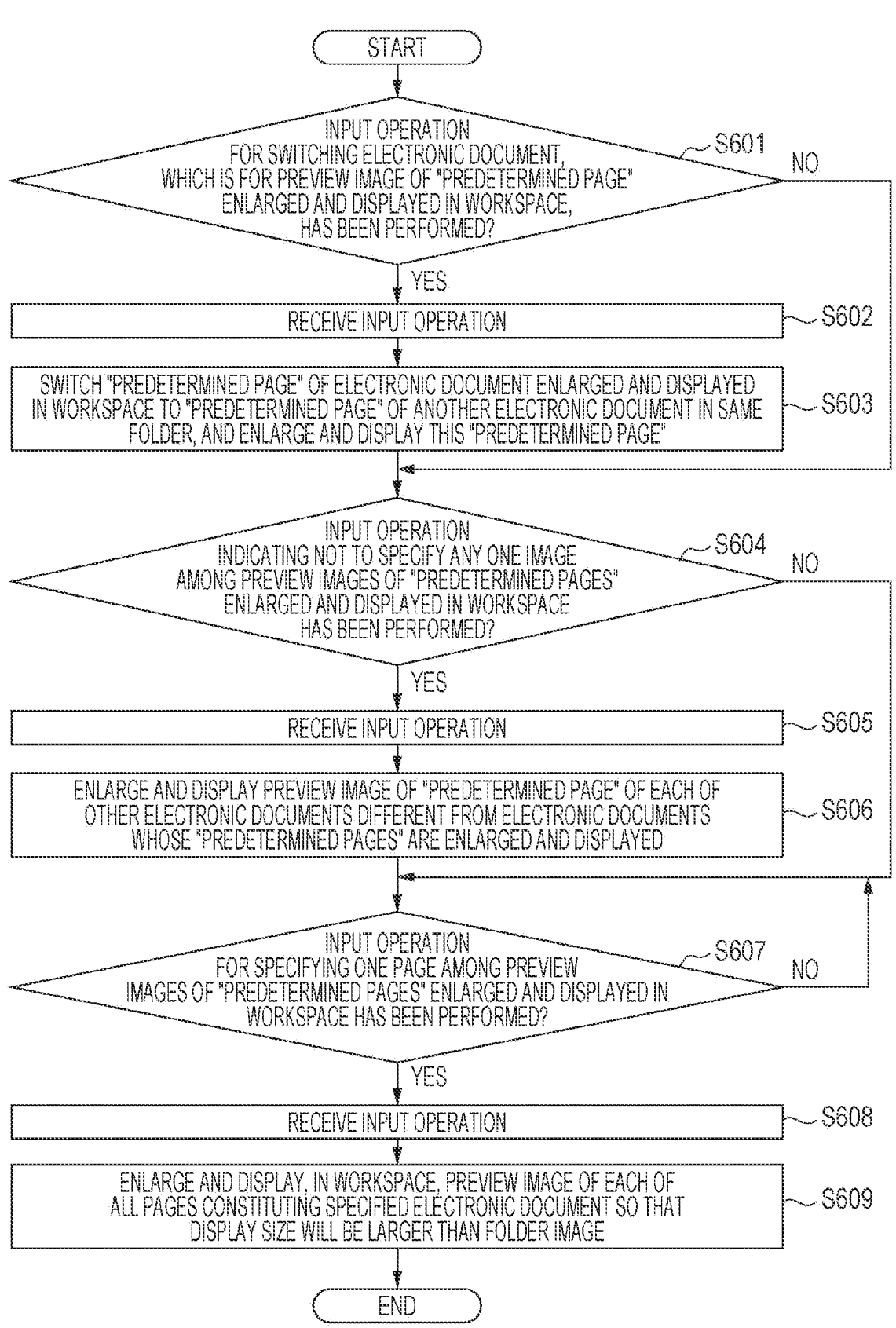
FIG. 6 is a flowchart illustrating the flow of a process of the user terminal.

FIGS. 5 and 6 are flowcharts each illustrating the flow of a process of the user terminal 10.

FIG. 5 illustrates, in the flow of the process of the user terminal 10, the flow from a process of managing a folder(s) in a database to a process of enlarging and displaying, in a workspace, "predetermined pages" of electronic documents included in a selected folder.

The user terminal 10 stores and manages a folder(s) each including a plurality of electronic documents in a database (step S501). Specifically, the user terminal 10 stores and manages one or more folders that are displayable in a workspace and that each include a plurality of electronic documents in the folder DB 131 in the storage unit 13 (see FIG. 2).

When an input operation for activating application software is performed (YES in step S502), the user terminal 10 receives the input operation (step S503), and displays a workspace on the display 16 (see FIG. 2) (step S504). In contrast, when an input operation for activating application software is not performed (NO in step S502), the user terminal 10 repeats step S502 until an input operation for activating application software is performed.

When an input operation for setting the display mode of the preview image of a "predetermined page" to be enlarged and displayed in the workspace is performed (YES in step S505), the user terminal 10 receives the input operation (step S506), and sets the display mode of the preview image of the "predetermined page" (step S507). Specifically, the user terminal 10 performs the setting of a page whose preview image is enlarged and displayed as a "predetermined page", and the setting of the appearance of the preview image that is enlarged and displayed.

When an input operation for selecting a folder to be displayed in the workspace is performed (YES in step S508), the user terminal 10 receives the input operation (step S509), and displays the image of the selected folder in the workspace (step S510). In addition, the user terminal 10 obtains operation log information of each of electronic documents included in the selected folder from the database (step S511). In contrast, in the case where an input operation for selecting a folder to be displayed in the workspace is not performed (NO in step S508), the user terminal 10 repeats step S508 until an input operation for selecting a folder to be displayed in the workspace is performed.

When an input operation for selecting the image of the folder displayed in the workspace is performed as the first input operation (YES in step S512), the user terminal 10 receives the input operation (step S513), and enlarges and displays, in the workspace, the preview image of a "predetermined page" of each of electronic documents included in the selected folder (step S514).

The "predetermined page" whose preview image is enlarged and displayed in the workspace is the page set in step S507 (such as the first page or the most recently opened page). In the case where an input operation for selecting the image of the folder displayed in the workspace is not performed (NO in step S512), the user terminal 10 repeats step S512 until an input operation for selecting the image of the folder displayed in the workspace is performed.

FIG. 6 illustrates, in the flow of the process of the user terminal 10, the flow from a process of switching the preview image of the "predetermined page" enlarged and displayed in the workspace to a process of enlarging and displaying, in the workspace, the preview image of a page constituting an electronic file specified by the user.

When an input operation for switching the electronic document, which is for the preview image of the "predetermined page" enlarged and displayed in the workspace, is performed (YES in step S601), the user terminal 10 receives the input operation (step S602), switches the "predetermined page" of the electronic document enlarged and displayed in the workspace to the "predetermined page" of another electronic document in the same folder, and enlarges and displays this "predetermined page" in the workspace (step S603). In contrast, in the case where an input operation for switching the electronic document is not performed (NO in step S601), the user terminal 10 proceeds to step S604.

When an input operation indicating not to specify any one image among the preview images of the "predetermined pages" enlarged and displayed in the workspace is performed (YES in step S604), the user terminal 10 receives the input operation (step S605), and enlarges and displays the preview image of the "predetermined page" of each of other electronic documents different from the electronic documents whose "predetermined pages" are enlarged and displayed in the workspace (step S606). In contrast, when an input operation indicating not to specify any one image among the preview images of the "predetermined pages" enlarged and displayed in the workspace is not performed (NO in step S604), the user terminal 10 proceeds to step S607.

When an input operation for specifying one page among the preview images of the "predetermined pages" enlarged and displayed in the workspace is performed (YES in step S607), the user terminal 10 receives the input operation (step S608). Accordingly, the electronic document is specified. The user terminal 10 performs control to enlarge and display, in the workspace, the preview image of each of all pages constituting the specified electronic document so that the display size thereof will be larger than the folder image (step S609).

In contrast, when an input operation. for specifying one page among the preview images of the "predetermined pages" enlarged and displayed in the workspace is not performed (NO in step S607), the user terminal 10 repeats step S607 until an input operation for specifying one page among the preview images of the "predetermined pages" that are enlarged and displayed is performed.

Flow of Process of Management Server

Figure 7:
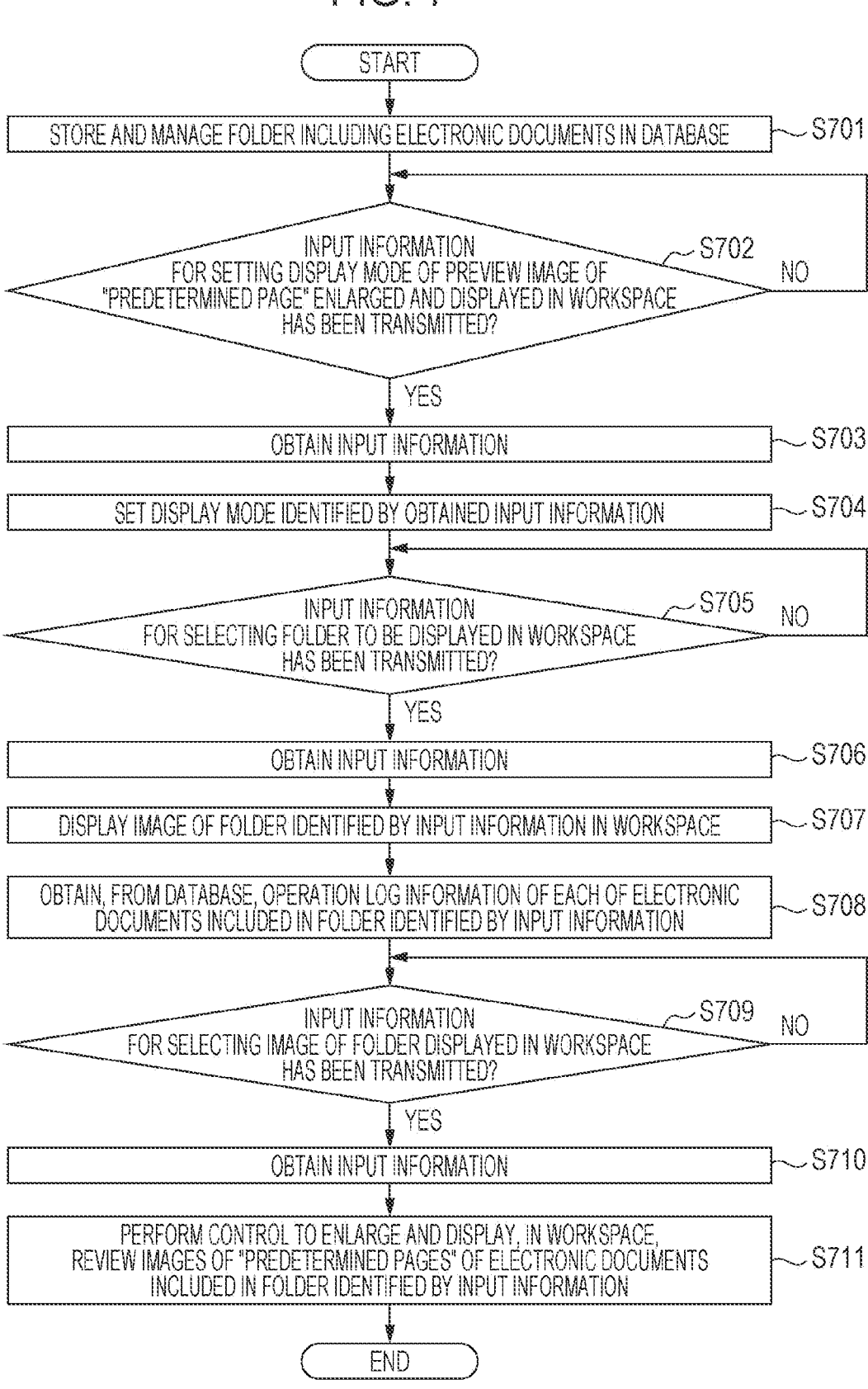
FIG. 7 is a flowchart illustrating the flow of a process of the management server in the case where the management server performs control to enlarge and display, in a workspace, the preview image of a "predetermined page" of each of a plurality of electronic documents included in a folder.

FIGS. 7 and 8 are flowcharts each illustrating the flow of a process of the management server 30 in the case where the management server 30 performs control to enlarge and display, in a workspace, the preview image of a "predeter-mined page" of each of a plurality of electronic documents included in a folder.

FIG. 7 illustrates, in the flow of the process of the management server 30, the flow from a process of managing a folder (s) in the database to a process of performing control to enlarge and display, in a workspace, a "predetermined page" of each of electronic documents included in a selected folder.

The management server 30 stores and manages a folder(s) each including a plurality of electronic documents in a database (step S701). In response to transmission of input information for setting the display mode of the preview image of a "predetermined page" enlarged and displayed in a workspace, which is input to the user terminal 10 in response to an input operation performed by the user (YES in step S702), the management server 30 obtains the input information (step S703), and sets the display mode identified by the obtained input operation (step S704).

In contrast, when input information for setting the display mode of the preview image of a "predetermined page" enlarged and displayed in a workspace is not transmitted (NO in step S702), the management server 30 repeats step S702 until input information for setting the display mode of the preview image of a "predetermined page" enlarged and displayed in a workspace is transmitted.

In response to transmission of input information for selecting a folder to be displayed in the workspace, which is input to the user terminal 10 in response to an input operation performed by the user (YES in step S705), the management server 30 obtains the input information (step S706), and displays the image of a folder identified by the input information in the workspace (step S707). The man-agement server 30 also obtains, from the database, operation log information of each of electronic documents included in the folder identified by the input information (step S708). In contrast, in the case where input information for selecting a folder to be displayed in the workspace is not transmitted (NO in step S705), the management server 30 repeats step S705 until input information for selecting a folder to be displayed in the workspace is transmitted.

In response to transmission of input information for selecting the image of the folder displayed in the workspace, which is input to the user terminal 10 in response to an input operation performed by the user (YES in step S709), the management server 30 obtains the input information (step S710), and performs control to enlarge and display, in the workspace, the preview image of the "predetermined page" of each of electronic documents included in the folder identified by the input information (step S711).

The "predetermined page" whose preview image is enlarged and displayed in the workspace is the page set in step S704 (such as the first page or the most recently opened page). In the case where input information for selecting the image of the folder displayed in the workspace is not transmitted (NO in step S709), the management server 30 repeats step S709 until input information for selecting the image of the folder displayed in the workspace is transmit-ted.

FIG. 8 illustrates, in the flow of the process of the management server 30, the flow from control to switch the preview image of the "predetermine. page" enlarged and displayed in the workspace to control to enlarge and display, in the workspace, the preview image of a page constituting an electronic file specified by the user.

In response to transmission of input information for switching the electronic document, which is for the preview image of the "predetermined page" enlarged and displayed in the workspace, which is input to the user terminal 10 in response to an input operation performed by the user (YES in step S801), the management server 30 obtains the input information (step S802), and performs control to switch the "predetermined page" of the electronic document enlarged and displayed in the workspace to the "predetermined page" of another electronic document in the same folder, and to enlarge and display this "predetermined page" in the work-space (step S803). In contrast, in the case where input information for switching the electronic document is not transmitted (NO in step S801), the management server 30 proceeds to step S804.

In response to transmission of input information indicat-ing not to specify any one image among the preview images of the "predetermined pages" enlarged and displayed in the workspace is transmitted (YES in step S804), the manage-ment server 30 obtains the input information (step S805), and performs control to enlarge and display the preview image of the "predetermined page" of each of other elec-tronic documents different from the electronic documents whose "predetermined pages" are enlarged and displayed in the workspace (step S806). In contrast, when input infor-mation indicating not to specify any one image among the preview images of the "predetermined pages" enlarged and displayed in the workspace is not transmitted (NO in step S804), the management server 30 proceeds to step S807.

In response to transmission of input information for specifying one page among the preview images of the "predetermined pages" enlarged and displayed in the work-space, which is input to the user terminal 10 in response to an input operation performed by the user (YES in step S807), the management server 30 obtains the input infor-mation (step 808), and performs control to enlarge and display, in the workspace, the preview image of each of ail pages constituting an electronic document identified by the input information so that the display size thereof will be larger than the folder image (step S809).

In contrast, when input information. for specifying one page among the preview images of the "predetermined pages" enlarged and displayed in the workspace is not transmitted (NO step S807), the management server 30 repeats step S807 until input information for specifying one page among the preview images of the "predetermined pages" that are enlarged and displayed is transmitted.

SPECIFIC EXAMPLES

FIGS. 9 to 12 are diagrams illustrating specific examples of a workspace displayed on the display 16 of the user terminal 10.

Figure 9:
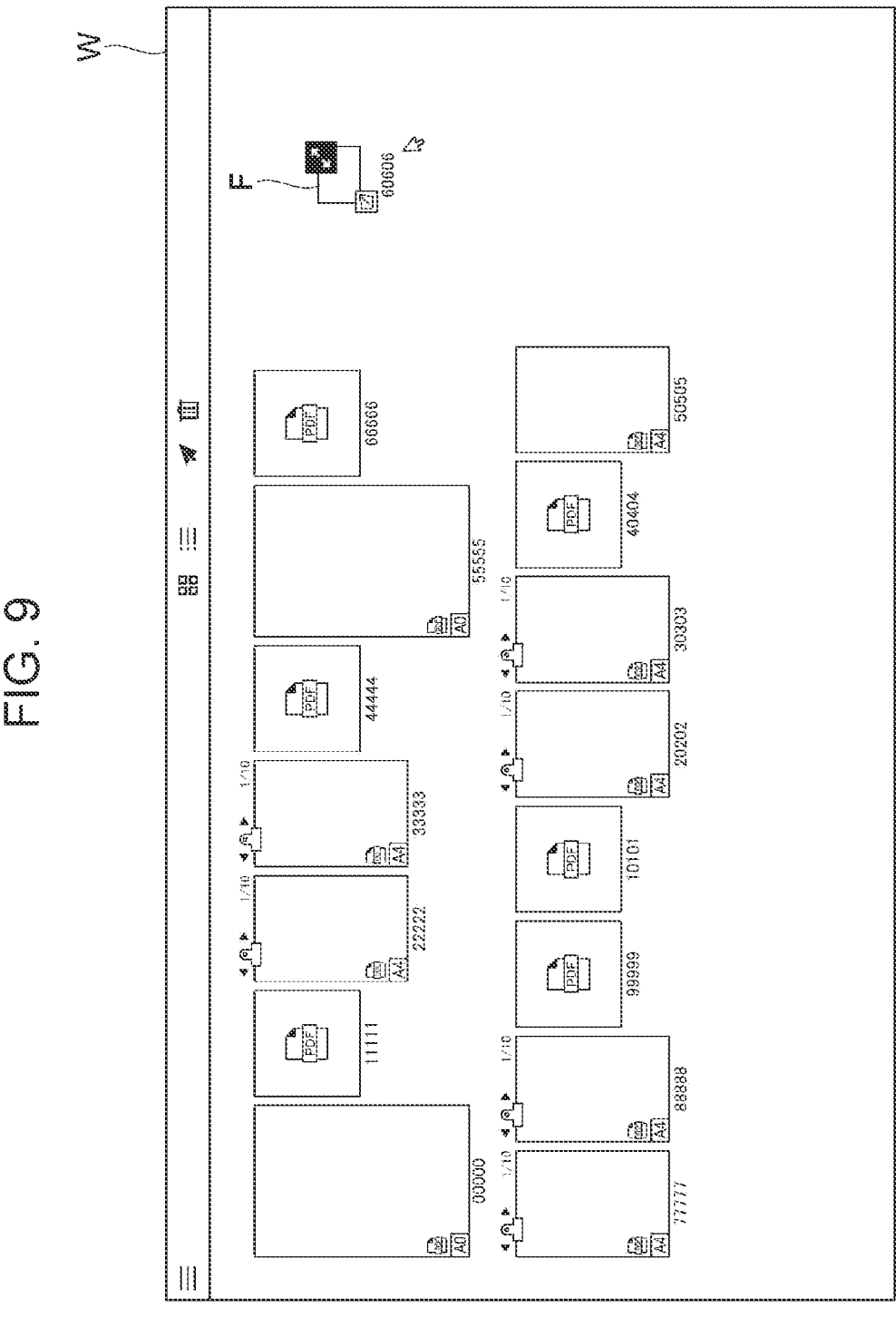
FIG. 9 is a diagram illustrating a specific example of a workspace displayed on the display of the user terminal.

As described above, when an input operation for selecting the image of a folder displayed in a workspace is performed as the first input operation, the preview image of a "predetermined page" of each of electronic documents included in the selected folder is enlarged and displayed in the workspace. FIG. 9 illustrates the state of a workspace W before an input operation for selecting a folder F is performed.

Figure 10:
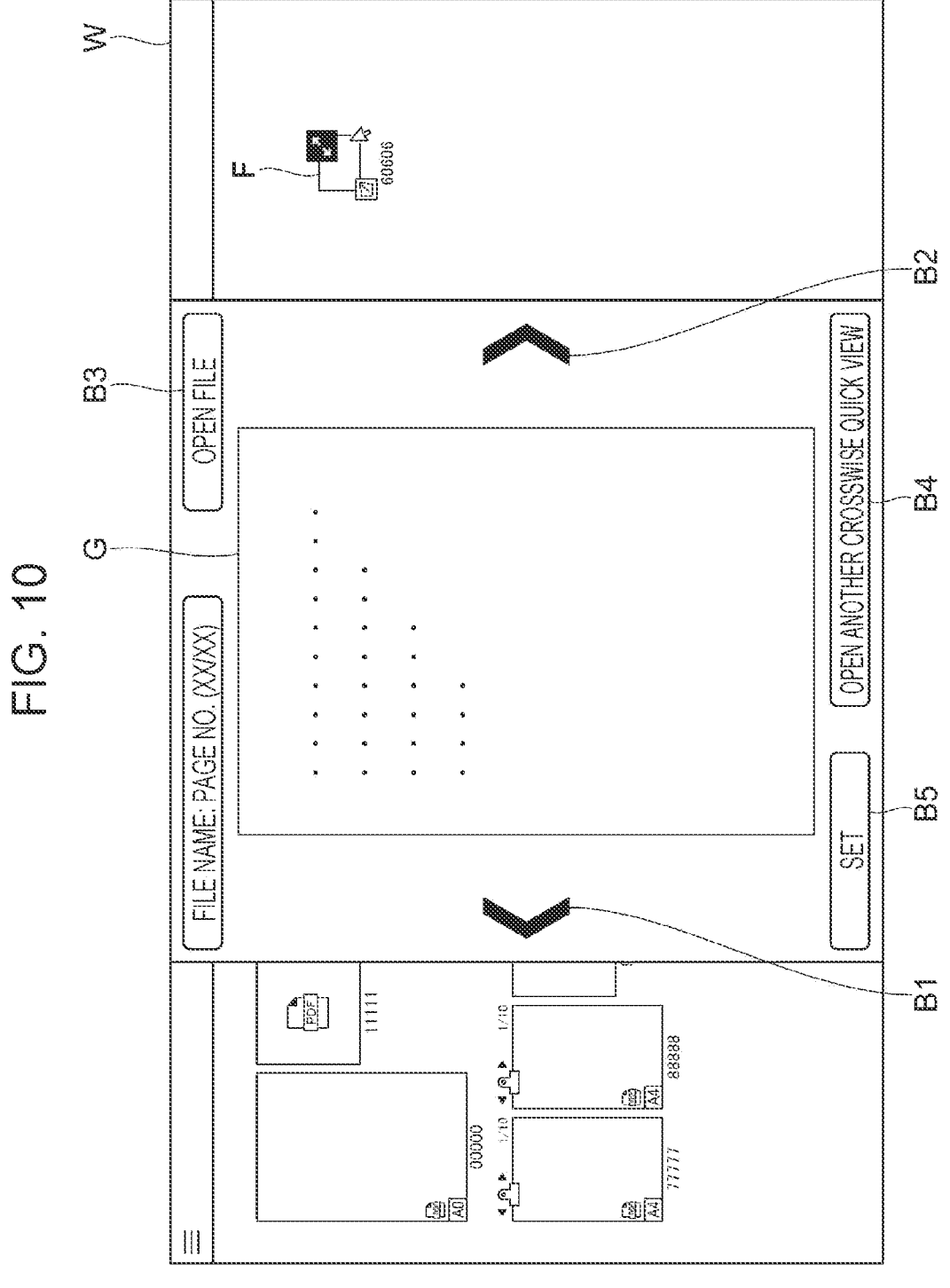
FIG. 10 is a diagram illustrating a specific example of a workspace displayed on the display of the user terminal.

FIG. 10 illustrates a specific example of the preview image of the "predetermined page" enlarged and displayed in the workspace W in response to an input operation for selecting the folder F. In the following description, the preview image of the "predetermined page" of each of electronic documents stored in the folder F, which is enlarged and displayed in the workspace W, be referred to as a "crosswise quick view".

When the user performs an input operation for switching the "predetermined page" displayed in a state where the crosswise quick view is being displayed, the preview image of the "predetermined page" of the electronic document displayed as the crosswise quick view is switched to the preview image of the "predetermined page" of another electronic document in the folder F. Specifically, as illustrated in FIG. 10, when either of document switching buttons B1 and B2, which are provided in the center of the left and right sides of the quick view, is pressed, a preview image G of the "predetermined page" of the electronic document displayed as the quick view is switched to a preview image G of the "predetermined page" of another electronic document in the folder F. Along with this, the name (file name) and the page number (page No.) of the electronic document, which are displayed in the upper left portion of the quick view, are also switched.

When the user performs an input operation for specifying one page among the preview images G of the "predetermined pages" of electronic documents that may be sequentially displayed as quick views on the basis of input operations, the preview image of each of all pages constituting an electronic document including the specified page may be sequentially enlarged and displayed. In the following description, the preview images of all pages constituting one specified electronic document, which are sequentially enlarged and displayed in the workspace W in response to input operations performed by the user, will be referred to as "normal quick views".

Note that the "input operation for specifying one page" is not particularly limited. For example, as illustrated in FIG. 10, the input operation may be an operation of pressing a button B3 labeled "Open file", which is arranged in the upper right portion of the quick view, or an operation (such as double clicking) of selecting the preview image G of the "predetermined page" displayed as the crosswise quick view.

In this manner, when, for example, the button B3 is pressed in a state where the crosswise quick view is being displayed in the workspace W, a normal quick view is displayed. When the normal quick view is displayed, as described above, control for supporting the user who visually recognizes the normal quick view is performed. For example, control to display the normal quick view so as to be superimposed on the crosswise quick view is performed.

The user performs the following input operation when displaying the crosswise quick view of each of electronic documents included in another folder F without performing an input operation for specifying one page among the preview images G of the "predetermined pages" of electronic documents that may be sequentially displayed as quick views on the basis of input operations. That is, the user performs an operation of pressing a button B4 labeled "Open another crosswise quick view" illustrated in FIG. 10. In this case, although not illustrated, another workspace, or a user interface in a mode where another folder is selectable may be displayed, or the "predetermined pages" of electronic documents included in another folder may be displayed as crosswise quick views.

In addition, the user may perform various settings of a crosswise quick view. In this case, the user may perform various settings of a crosswise quick view by performing an operation of pressing a button B5 labeled "Set", which is arranged in the lower left portion of the crosswise quick view illustrated in FIG. 10. When the button B5 is pressed, for example, a crosswise quick view setting screen H is displayed in the workspace W, as illustrated in FIG. 11.

Figure 11:
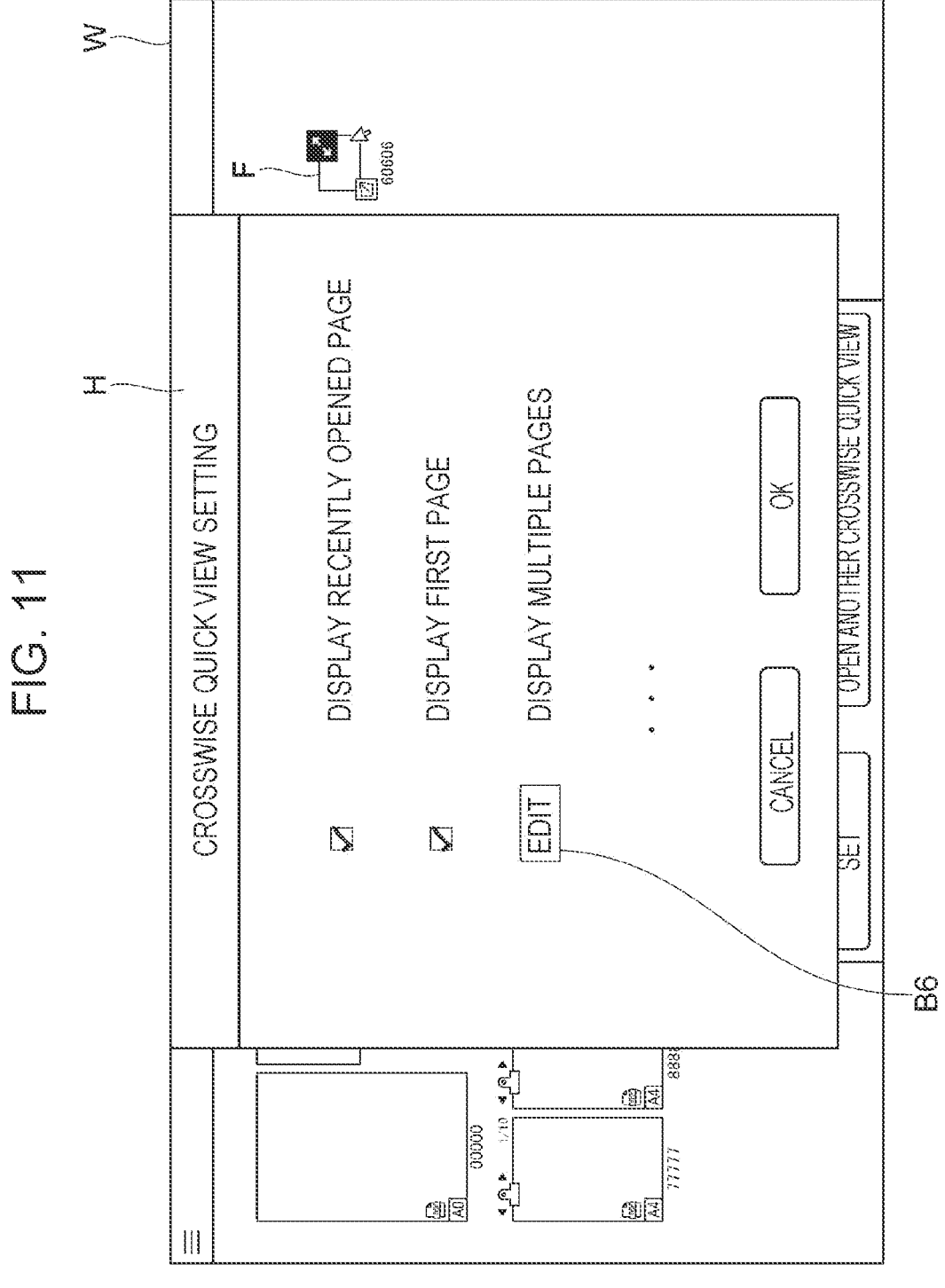
FIG. 11 is a diagram illustrating a specific example of a workspace displayed on the display of the user terminal.

FIG. 11 illustrates a specific example of the crosswise quick view setting screen H, which is displayed when the button B5 illustrated in FIG. 10 is pressed. On the setting screen H, a menu for performing various settings of the crosswise quick view is displayed. In the example illustrated in FIG. 11, a menu for setting a "predetermined page" is displayed. Specifically, the checkbox of each of "Display recently opened page" and "Display first page" is checked as the "predetermined page". This indicates that, as the "predetermined page", depending on the situation, either of the first page of each of electronic documents included in a folder and a page most recently opened by, the user is displayed as a quick view.

In addition, "Display plural pages" is a menu for specifying a plurality of pages as "predetermined pages". When the user performs an operation of pressing a button B6 labeled "Edit", the user may individually specify "predetermined pages". Specifically, the user may specify particular pages, a few pages before and after a particular page(s), a few pages before and after a page most recently opened by the user, or the like.

As illustrated in the above-described example illustrated in FIG. 10, although the "predefined page" displayed as the crosswise quick view is a single page, the display mode may be changed in accordance with the number of pages constituting the electronic document. For example, in the case where the number of pages constituting the electronic document is "three pages", the display mode may be changed to place a page displayed as the crosswise quick view at the top of a stack of three sheets of paper that are superimposed on one another.

Figure 12:
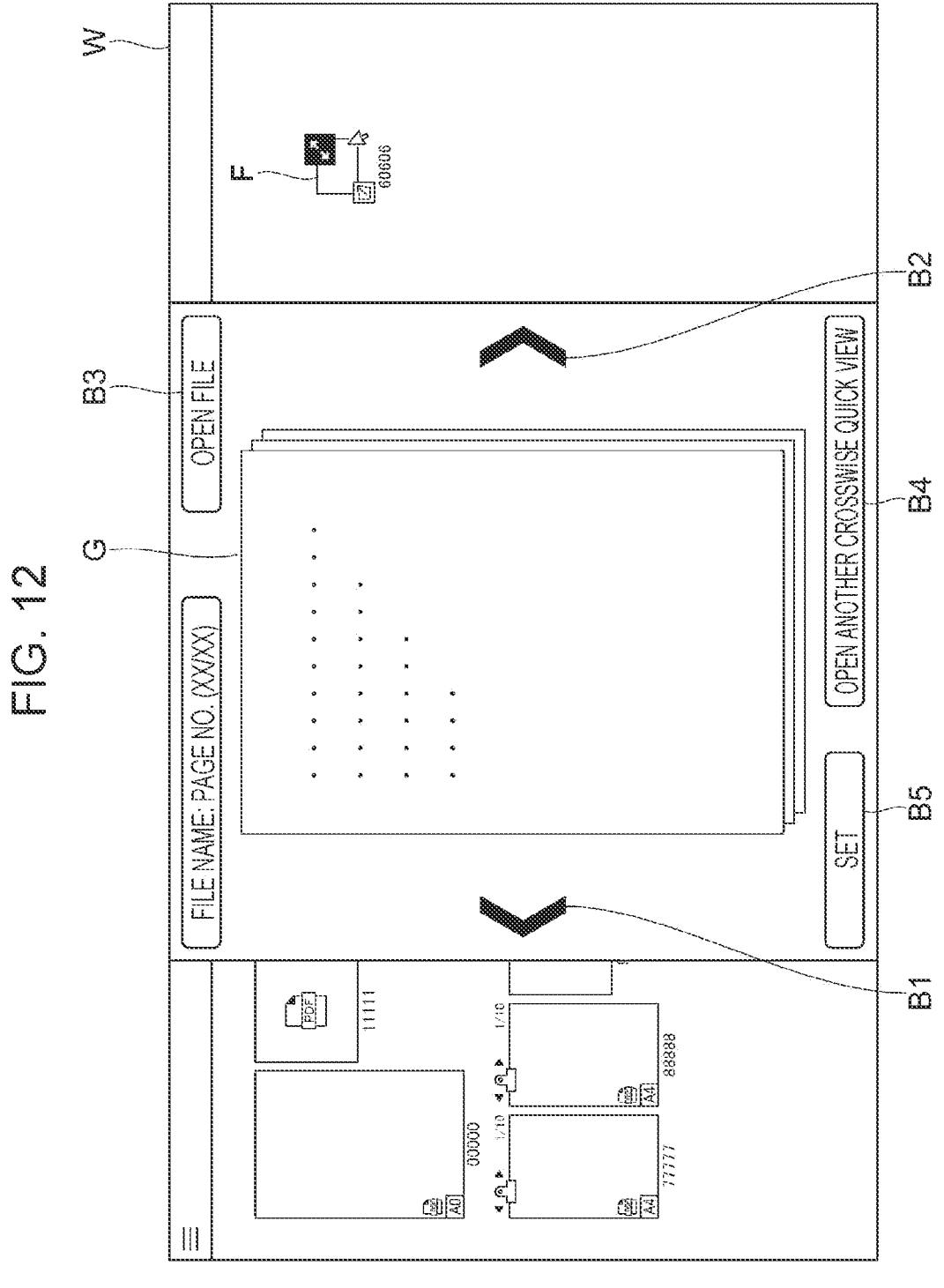
FIG. 12 is a diagram illustrating a specific example of a workspace displayed on the display of the user terminal.

FIG. 12 illustrates a specific example of a page whose display mode has been changed. In the example illustrated in FIG. 12, the display mode is changed to place the preview image G of a page displayed as a crosswise quick view at the top of a stack of three sheets of paper that are superimposed on one another. Accordingly, the user may grasp at a glance that pages constituting the electronic document, including the page displayed as the crosswise quick view, are all the pages. Note that the display mode of the page displayed as the crosswise quick view need not match the number of pages constituting the electronic document. For example, although not illustrated, in the case where the electronic document is constituted of a plurality of pages, the display mode may be changed to enable the user to grasp at a glance that the electronic document is not constituted of a single page (such as the display mode indicating that the electronic document is not a single page, but includes a stack of sheets).

Although the present exemplary embodiment has been described above, the present disclosure is not limited to the above-described present exemplary embodiment. In addition, effects of the present disclosure are not limited to those mentioned in the above-described present exemplary embodiment. For example, the configuration of the information processing system 1 illustrated in FIG. 1 and the hardware configuration of the user terminal 10 illustrated in FIG. 2 are merely examples for achieving an object of the present disclosure, and are not particularly limited. In addition, the functional configuration of the user terminal 10 illustrated in FIG. 3 and the functional configuration of the management server 30 illustrated in FIG. 4 are merely examples and are not particularly limited. It is sufficient if the information processing system 1 illustrated in FIG. 1 is equipped with a function(s) capable of executing the above-described processes as a whole, and what kind of functional configuration is used to realize the function(s) is not limited to the examples illustrated in FIGS. 3 and 4.

In addition, the orders of the steps of the processes of the user terminal 10 illustrated in FIGS. 5 and 6 and the steps of the processes of the management server 30 illustrated in FIGS. 7 and 8 are merely examples and are not particularly limited. In addition to processes that are performed in time series according to the orders of the illustrated steps, the steps may be performed in parallel or individually without necessarily being processed in time series. In addition, the specific examples illustrated in FIGS. 9 to 12 are merely examples and are not particularly limited.

For example, although it is configured in the specific example illustrated in FIG. 10 that various settings of the crosswise quick view may be performed by performing an operation of pressing the button B5 labeled "Edit", this is not the only possible configuration, and, for example, various settings of the crosswise quick view may be performed by performing an operation such as a right click at any position in an area displayed as a quick view.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
a processor configured to:
   receive an input operation performed by a user on an image representing a collection of a plurality of electronic documents stored in a same folder, the image being displayed on a display, wherein the input operation comprises one of: superimposing a cursor which moves on the display on the image representing the collection, or clicking on the image representing the collection; and
   perform control to enlarge and display, on the display, an image of a predetermined page determined in advance for each of the electronic documents, among one or more pages constituting each of the electronic documents, so as to allow scrolling through the image of only the predetermined page determined in advance for each of the electronic documents stored in the same folder, without moving the image representing the collection and while displaying image representing the collection.

2. The information processing system according to claim 1, wherein:
the processor is configured to:
   receive, as the input operation, an operation of selecting the image representing the collection; and
   perform control to enlarge and display, on the display, a preview image of the predetermined page as the image of the predetermined page so that a display size thereof will be larger than the image representing the collection.

3. The information processing system according to claim 2, wherein the processor is configured to perform control to enlarge and display, on the display, a preview image of a first page of each of the electronic documents as the preview image of the predetermined page so that a display size thereof will be larger than the image representing the collection.

4. The information processing system according to claim 2, wherein the processor is configured to perform control to enlarge and display, on the display, a preview image of a page most recently opened by the user as the preview image of the predetermined page so that a display size thereof will be larger than the image representing the collection.

5. The information processing system according to claim 2, wherein, among the plurality of electronic documents, for an electronic document that has never been opened by an input operation performed by the user, the processor is configured to perform control to enlarge and display, on the display, a preview image of a first page of the electronic document as the preview image of the predetermined page so that a display size thereof will be larger than the image representing the collection.

6. The information processing system according to claim 2, wherein the processor is configured to perform control to switch and display the preview image of the predetermined page in accordance with an input operation performed by the user.

7. The information processing system according to claim 5, wherein the processor is configured to change a display mode of the preview image of the predetermined page in accordance with a number of pages constituting each of the electronic documents.

8. The information processing system according to claim 7, wherein the processor is configured to perform control to enlarge and display the preview image of the predetermined page in a mode in which the number of pages constituting each of the electronic documents is visually recognizable.

9. The information processing system according to claim 2, wherein:

the processor is configured to:

receive an input operation of selecting the image of the predetermined page of a certain electronic document among the plurality of electronic documents; and perform control to enlarge and display, on the display, a preview image of each of one or more pages constituting the certain electronic document so that a display size thereof will be larger than the image representing the collection.

10. The information processing system according to claim 9, wherein the processor is configured to perform control to support visual recognition of the user, who visually observes the preview image of each of the one or more pages constituting the certain electronic document.

11. The information processing system according to claim 10, wherein the processor is configured to perform, as control to support visual recognition of the user, any one of:

control to superimpose, enlarge, and display the preview image of each of the one or more pages on the preview image of the predetermined page, control to display the preview image of the predetermined page so that a display size thereof will be smaller than the preview image of each of the one or more pages constituting the certain electronic document, and control not to display the preview image of the predetermined page.

12. The information processing system according to claim 9, wherein the processor is configured to receive, as the input operation of selecting the image of the predetermined page of the certain electronic document, an operation on a button displayed along with each of the preview images.

13. The information processing system according to claim 2, wherein:

the processor is configured to:

receive an input operation indicating not to specify the image of the predetermined page of a certain electronic document among the plurality of electronic documents; and perform control to enlarge and display, on the display, a preview image of a predetermined page determined in advance for each of other electronic documents different from the certain electronic document, among one or more pages constituting each of the other electronic documents.

14. The information processing system according to claim 13, wherein the processor is configured to receive, as the input operation indicating not to specify the image of the predetermined page of the certain electronic document, an operation on a button displayed along with the preview image of the predetermined page determined in advance for the certain electronic document.

15. The information processing system according to claim 2, wherein the processor is configured to receive an input operation for setting a display mode of preview images of a plurality of the predetermined pages enlarged and displayed on the display.

16. The information processing system according to claim 15, wherein the processor is configured to receive, as the input operation for setting, an operation on a button displayed along with each of the preview images of the predetermined pages.

17. A non-transitory computer readable medium storing a program causing a computer to execute a process, the process comprising:

receiving an input operation performed by a user on an image representing a collection of a plurality of electronic documents stored in a same folder, the image being displayed on a display, wherein the input operation comprises one of: superimposing a cursor which moves on the display on the image representing the collection, or clicking on the image representing the collection; and performing control to enlarge and display, on the display, an image of a predetermined page determined in advance for each of the electronic documents, among one or more pages constituting each of the electronic documents, so as to allow scrolling through the image of only the predetermined page determined in advance for each of the electronic documents stored in the same folder, without moving the image representing the collection and while displaying the image representing the collection.

18. An information processing method comprising:

receiving an input operation performed by a user on an image representing a collection of a plurality of electronic documents stored in a same folder, the image being displayed on a display, wherein the input operation comprises one of: superimposing a cursor which moves on the display on the image representing the collection, or clicking on the image representing the collection; and performing control to enlarge and display, on the display, an image of a predetermined page determined in advance for each of the electronic documents, among one or more pages constituting each of the electronic documents, so as to allow scrolling through the image of only the predetermined page determined in advance for each of the electronic documents stored in the same folder, without moving the image representing the collection and while displaying the image representing the collection.

* * * * *